United States Patent [19]

Huang et al.

[11] Patent Number: 5,324,891
[45] Date of Patent: Jun. 28, 1994

[54] SUPERCONDUCTING CONNECTING LEADS HAVING THERMAL PLUG

[75] Inventors: Xianrui Huang; Yehia M. Eyssa, both of Madison, Wis.

[73] Assignee: Wisconsin Alumni Research Foundation, Madison, Wis.

[21] Appl. No.: 724,203

[22] Filed: Jul. 1, 1991

[51] Int. Cl.$^5$ .............................. H01B 12/00
[52] U.S. Cl. .................... 174/15.4; 174/15.5; 505/700; 505/875; 505/885
[58] Field of Search ............... 174/125.1, 126.1, 128.1, 174/15.4, 15.5; 505/884, 885, 875, 700, 704, 856, 886, 887

[56] References Cited

U.S. PATENT DOCUMENTS

| | | | |
|---|---|---|---|
| 3,654,377 | 4/1972 | Fleming et al. | 174/15.4 |
| 4,447,670 | 5/1984 | Eckels | 174/15.4 |
| 5,057,645 | 10/1991 | Hilal | 505/15.4 |
| 5,065,582 | 11/1991 | Seifert | 505/879 X |

FOREIGN PATENT DOCUMENTS

| | | | |
|---|---|---|---|
| 0086275 | 5/1984 | Japan | 505/875 |
| 59-98505 | 6/1984 | Japan | 174/15.4 |
| 0150487 | 8/1984 | Japan | 505/875 |

OTHER PUBLICATIONS

M. A. Hilal, "Low Heat Leak Current Leads For Space Borne Magnets", Paper presented at the 1989 CEC Conference, Los Angeles, Calif., Jul. 26, 1989.

Abstracts of 1990 Applied Superconductivity Conference, Snowmass Village, Colo., Sep. 24-28, 1990.
D. U. Gubser, et al., "Superconducting Current Leads of YBCO and Pb-BSCCO", IEEE Trans on Magnetics, vol. 27, No. 2, Mar. 1991, pp. 1854-1856.
B. Dorri, et al., "High Temperature Superconducting Current Leads for Cyrogenic Applications in Moderate Magnetic Fields", IEEE Trans on Magnetics, vol., 27, No. 2, Mar. 1991, pp. 1858-1860.
J. L. Wu, et al., "Design and Testing of a High Temperature Superconducting Current Lead," IEEE Trans on Magnetics, vol. 27, No. 2, Mar. 1991, pp. 1861-1865.
W. N. Lawless, "77-4.2 K Downlead Concempt Based on Thin-Film BiCaSrCu Oxide," Cyrogenics, Vo. 31, Jan. 1991, pp. 41-47.

Primary Examiner—Leo P. Picard
Assistant Examiner—Hyung S. Sough
Attorney, Agent, or Firm—Foley & Lardner

[57] ABSTRACT

A thermal plug which provides an electrical connection between first and second regions at different temperatures includes a plurality of interleaved heat transfer resistive laminae and heat conductive laminae. The laminae are stacked together to form a laminate and a plurality of superconducting strands are attached to the stack such that they are in thermal contact with the laminate. The superconducting strands are also in electrical contact with a conductor (e.g., a low temperature superconductor), in the first region and a conductor in the second region to allow the supply and withdrawal of electrical energy to and from the conductor in the first region.

35 Claims, 5 Drawing Sheets

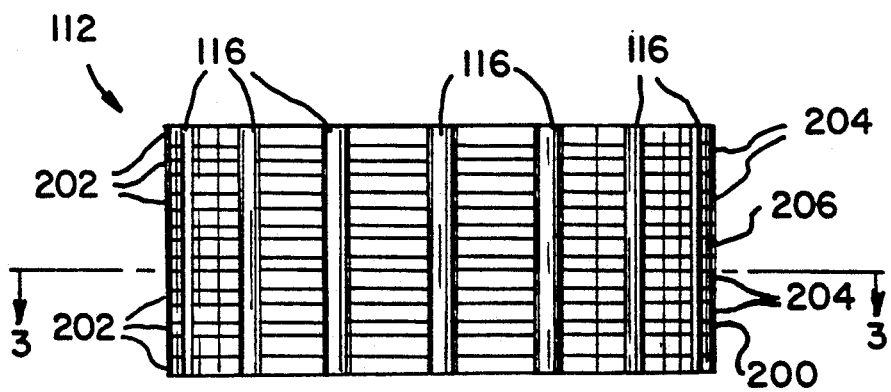
FIG. 2
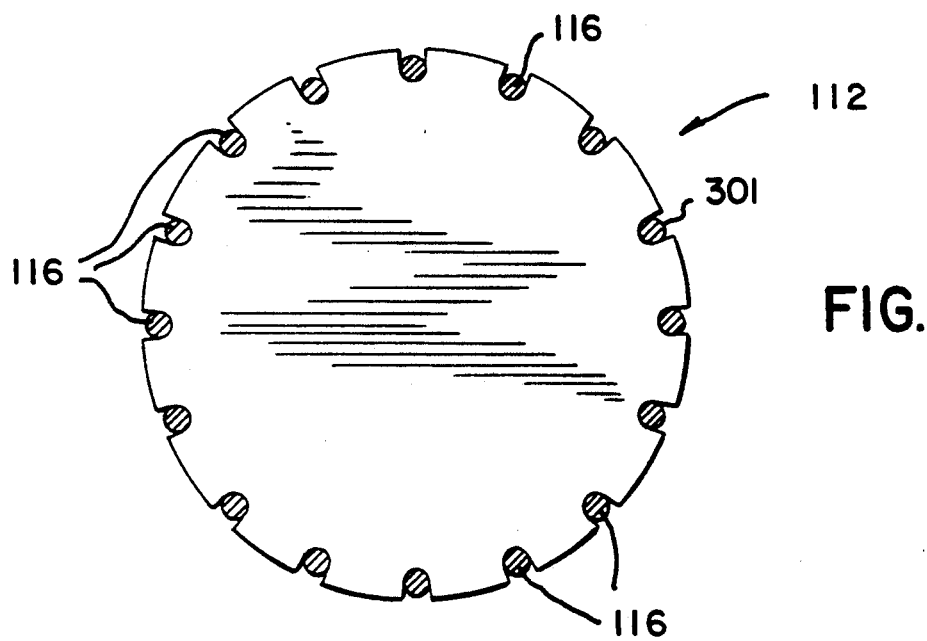
FIG. 3
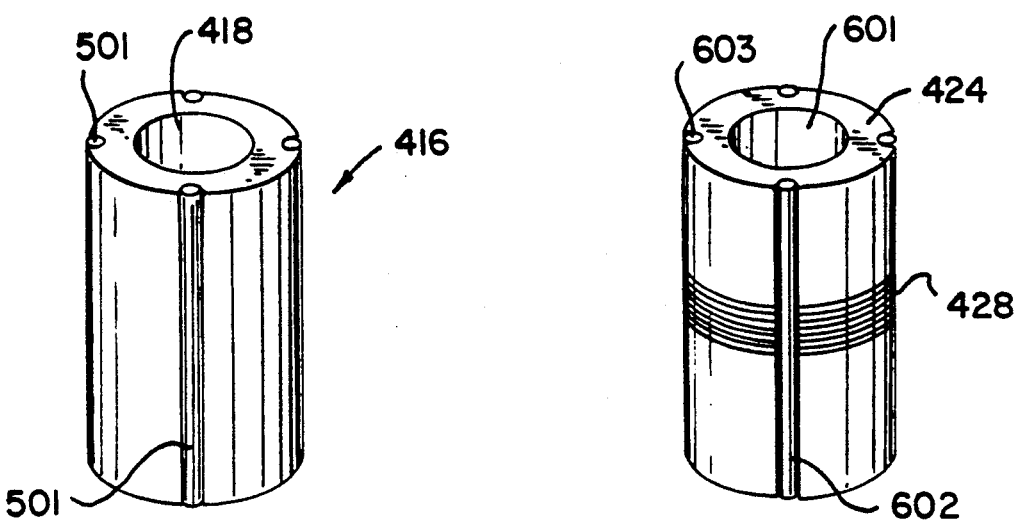
FIG. 5
FIG. 6

SUPERCONDUCTING CONNECTING LEADS HAVING THERMAL PLUG

FIELD OF THE INVENTION

This invention relates generally to electrical leads for devices maintained at cryogenic temperatures and in particular to electrical leads in the transition between two regions of different temperatures.

BACKGROUND OF THE INVENTION

Devices employing low temperature superconductors must be refrigerated to bring the superconducting material below the critical temperature at which the material becomes superconducting. For many superconductors (low temperature superconductors) this critical temperature is extremely low, often in the vicinity of the temperature of liquid helium. Other superconductors are high temperature superconductors (HTS) and must be maintained at less than about 82K (for presently available HTS materials). In either case the difference between room temperature (295K) and the temperature of the superconducting device can be very large. Also, the temperature difference between a region containing a low temperature superconductor and a region containing an HTS may be very large. As a result of this large temperature difference the energy lost through even a small thermally conductive area in the electrical lead transition between these regions can be significant.

In some applications a low temperature superconductor is maintained at a desired low temperature (less than 2.17K) by means of a superfluid helium (He II) bath at 1.8K in a first region. An adjacent region is maintained at 4.2K in a liquid helium (He I) bath. The length to cross-sectional area of this region is a trade off between lower heat conduction during operation when the lead is superconducting and less ohmic heating when the lead becomes a normal conductor due to an energy disturbance. It is advantageous to minimize any heat leak to 1.8K as removal of one watt of heat leak requires about 1000 watts of refrigeration power.

Heat transfer may occur through electrical leads (transition leads) which bridge the room temperature environment of a power supply and the very low temperature environment of a superconducting device. The leads are provided to supply current to the superconducting device from outside the refrigerated device, and often carry very high currents. Unfortunately, normal conductors of electricity—especially those designed for high current loads—are generally excellent thermal conductors. Also, when large amounts of current flow through a normal conductor, resistive heat losses are generated. Consequently, when normal conducting leads are connected to the refrigerated superconducting device, they can place a significant load on the refrigerating equipment for the superconducting device. The added power required to refrigerate the device can significantly degrade the total power efficiency of the system.

In many superconductor applications, for example in the superconducting magnets used in nuclear magnetic resonance diagnostic machines and particle accelerators, a current is only applied to the device during the charge and discharge of the device. Since the time devoted to charging and discharging the device can be very small in proportion to the time when the device need not be electrically connected to the exterior (in a standby mode), it is common practice to disconnect the electric leads into the device throughout the standby period.

Unfortunately, the mechanical joints in detachable leads reduce the reliability of the system. The mechanical joints are exposed to extreme temperature variations and a harsh environment which can lead to a connection failure that could be disastrous to the functioning of the superconducting device.

Another system, described in U.S. patent application Ser. No. 07/422,642, by Hilal, entitled Low Heat Loss Lead Interface now U.S. Pat. No. 5,057,645, includes a disk separating two regions of different temperatures. Within the disk, there is a superconductive winding. One side of the disk is connected to a normal conducting lead in a relatively warm region. The other side of the disk is connected to a superconducting lead in a relatively cold region. The disk is metal and has a channel formed therein to allow a coolant to pass through it. Another type of lead for connecting a superconductor in a first temperature region to second temperature region was described in the 1990 Applied Superconductivity Conference, Snow Mass Village, Colorado, Sep. 24-28, 1990. The leads described therein were designed to connect low temperature superconductors to high temperature superconductors (HTS), and the lower part of the conventional copper leads were replaced with HTS tapes or bars. The HTS tapes or bars provide no $I^2R$ loss and very little heat conduction. However, these kinds of leads are unstable. If the HTS goes normal (i.e. the temperature rises to the point that the HTS stops superconducting), the current has no copper shunt to flow through because the copper shunt is removed to reduce the heat load by conduction, resulting in excessive heating with quickly rising temperature.

SUMMARY OF THE INVENTION

A superconducting connecting lead having a thermal plug in accordance with the present invention electrically connects a first region and a second region through a transition region, the first and second regions being at different temperatures, and includes a plug formed of a plurality of interleaved heat transfer resistive laminae and good heat transfer conductive laminae. The laminae are held closely together to form a laminated stack, typically with one end of the stack adjacent the first region and the other end of the stack adjacent the second region. A plurality of superconducting strands are attached to the outer surface of the stack such that they are in heat transfer contact with the laminae. The superconducting strands are also in electrical contact with a conductor in the first region and with a conductor in the second region, both of which may be superconductors.

The lead with thermal plug may be incorporated with a superconducting lead having a first region disposed in a first dewar and maintained at a first temperature and a second region, disposed in a second dewar and maintained at a second temperature. A heat insulation flange, disposed therebetween, has an opening through which the lead extends between the first and second regions. A thermal plug formed as a stack of interleaved heat resistive laminae and heat conductive laminae is disposed within the opening. A plurality of superconducting strands are attached to, and in heat transfer contact with, the laminae. The superconducting strands are also in electrical contact with a conductor in the first region and a conductor in the second region.

The present invention may also be embodied as a transition lead electrically connecting a first conductor at a first temperature through a transfer region to a second conductor at a second temperature and includes a plurality of copper tubes bundled together, each having a first end connected to the first conductor and a second end connected to the second conductor. The copper tubes have a plurality of superconducting strands located on their exterior surfaces, which are electrically connected to the first conductor and the second conductor. The copper tubes have a plurality of the thermal plug laminates of the present invention disposed therein at spaced positions to provide thermal breaks from the first conductor to the second conductor. Moreover, at least one of the laminae in each of the stacks is heat transfer resistive and the superconducting strands are attached to the perimeter of the stacks.

Further objects, features, and advantages of the present invention will be apparent from the following detailed description when taken in conjunction with the accompanying drawings.

BRIEF DESCRIPTION OF THE DRAWINGS

In the drawings:

FIG. 2 is a cross-sectional view of the thermal plug of the present invention;

FIG. 3 is a cross-sectional view taken along lines 3—3 of FIG. 2;

FIG. 5 is a side view of one of the conductors of the warm end of the electrical lead of FIG. 4.

FIG. 6 is a side view of one of the conductors of the cold end of the electrical lead of FIG. 4;

DETAILED DESCRIPTION OF THE INVENTION

Figure 1:
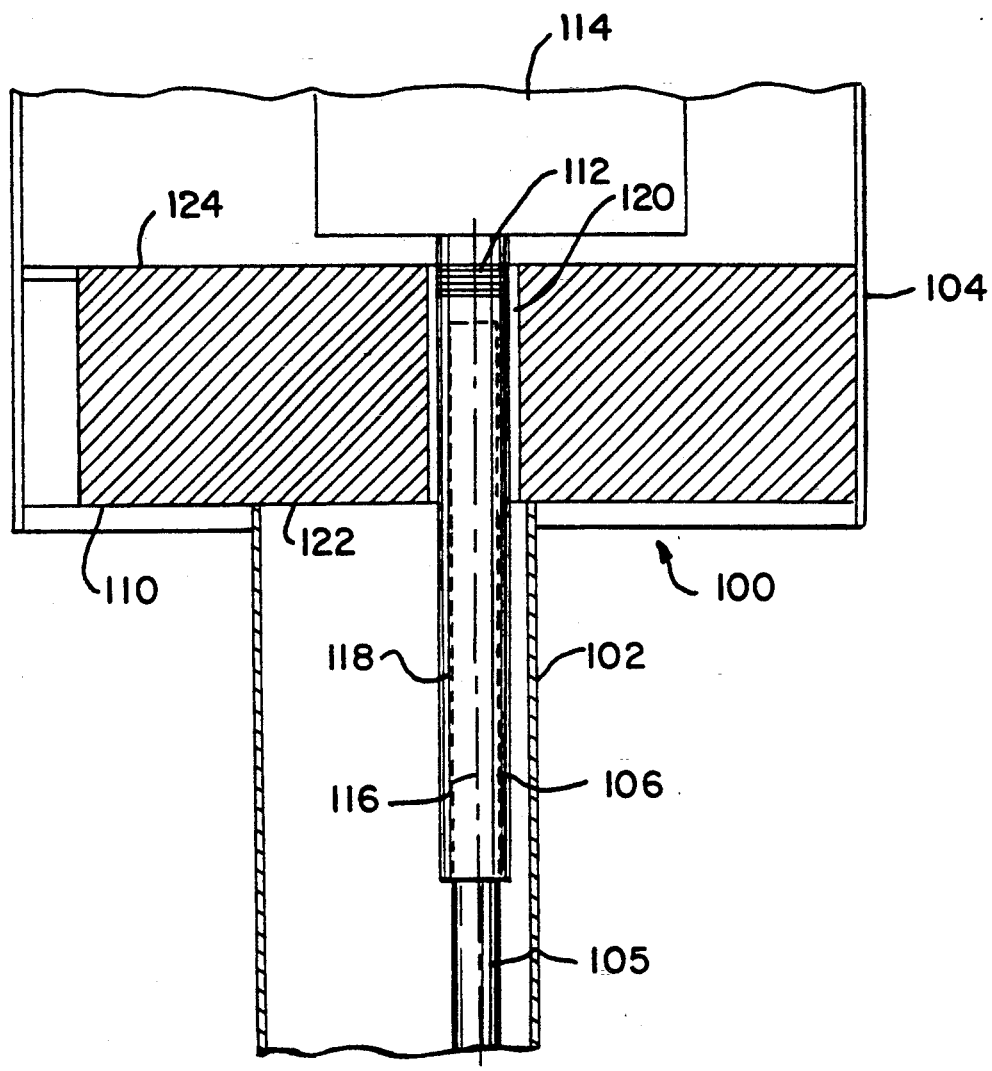
FIG. 1 is a partial cross-section of a device of the invention having a transition between He II and He I regions.

An exemplary application of the present invention is in providing a superconductive electrical connection between a superconductor in a superfluid Helium (He II) region and a conductor in a liquid helium (He I) region. With reference to the drawings, FIG. 1 shows a cross section of part of an illustrative superconductive device, designated generally at 100, which includes such regions and a transition region between them. The device 100 includes cylindrical insulating dewars 102 and 104, a superconducting lead 105 in the first region, a transition lead 106, an insulating flange 110, a thermal plug 112 and a conducting lead 114 in the second region, which may be a normal conducting lead.

The dewar 102 is provided to maintain a helium II bath at a temperature below the Lambda point (2.17K), and preferably at a temperature of 1.8K. Within the superfluid helium II bath, the superconducting lead 105 may be connected to another superconductor (not shown), such as an electrical energy storage magnet, which is also maintained at a temperature of 1.8K. The transition lead 106 includes a plurality of superconducting strands 116 attached to a solid core formed of a very good thermal conductor such as OFHC copper. The transition lead 106 extends through the He II region and into a cylindrical opening 120 through the flange 110. The flange 110 is composed of a material which is highly heat insulatory at cryogenic temperatures, such as G10 fiberglass epoxy, and has a first surface 122 that faces the 1.8K superfluid helium II region maintained by the dewar 102. A second surface 124 of the flange 110 faces a 4.2K liquid helium (He I) region maintained within the dewar 104, and thus the flange 110 thermally insulates the 4.2K and 1.8 k regions. The dewar 104 encircles both the flange 110 and the 4.2K liquid helium region.

A solid copper lead 118 is soldered onto a first end of the thermal plug 112, which is also disposed within the cylindrical region 120 of the flange 110. The thermal plug 112 is preferably positioned axially within the cylindrical region 120 such that a second end of the thermal plug 112 is substantially flush with the surface 124 of the flange 110. In other embodiments of the invention, the thermal plug 112 may be disposed such that its second end is not flush with the surface 124 of the flange 110.

A normal lead 114, preferably also a solid lead comprised of OFHC copper, is soldered onto the second surface of the thermal plug 112 (i.e. the surface that is flush with surface 124 of the flange 110) within the 4.2K liquid helium region. Current may be provided to, or withdrawn from the superconducting device through the normal lead 114, the thermal plug 112 and transition lead 106, and the superconducting lead 105. As will be described below with reference to FIGS. 2 and 3, the thermal plug 112 is designed to conduct electricity between the 4.2K and 1.8K regions while providing very low heat conduction between these regions.

The thermal plug 112 may operate in one of three modes. First, for $0 < I < I_{c1}$, where I is the current flowing in the thermal plug 112 and $I_{c1}$ is a first critical current of the thermal plug 112, the thermal plug 112 is stable against thermal disturbances, i.e., it will always recover the superconducting state of its superconducting strands 116 following normalization. At these currents, cooling of the strands from the 4.2K and 1.8K regions will cool any hot spots created in a strand by resistive heat generated as a result of normalization. When one strand 116 goes normal, the cooling of the ends of the plug 112 is higher than the ohmic heating in the strands, allowing the normalized strand to cool down and regain the superconducting state.

In the second mode of operation, $I_{c1} < I < I_{c2}$, where $I_{c2}$ is a second critical current of the thermal plug 112, a strand (or strands) of the plug becomes normal and remains normal. In this mode, the end cooling of the strand or strands balances the resistive heat generation within the plug and, therefore, the temperature will not increase further. The maximum temperature will be about 15K and the superconducting strands 116 remain stable with respect to temperature.

In the third mode of operation, $I > I_{c2}$, the temperature of the strands 116 of the thermal plug 112 increases with time after a thermal disturbance. In this case, the end cooling of the strands is not sufficient to prevent the resistive heat that is generated from increasing the temperature of the strands and the thermal plug 112. When operating in this mode of operation, as the temperature of the superconducting strands 116 within the thermal plug 112 rises at a hot spot, the portions of the superconducting strands 116 near the hot spot may also go normal. This results in further resistive heat generation, and an even greater portion of superconducting strands 116 going normal, and so on. Accordingly, a large thermal capacity and rapid thermal diffusion are needed to reduce the rate of temperature rise so that a protection circuit can respond to shutoff of the current flowing through the superconducting strands 116 in the thermal plug 112. As one skilled in the art will recognize, $I_{c1}$ and $I_{c2}$ are dependant on the temperature of operation, the diameter of the conductors, and the construction of thermal plug 112.

To avoid operating in the third mode, and to allow time to shut off the current if the thermal plug 112 begins operating in the third mode, the thermal plug 112 preferably should have both a high specific heat and a short thermal diffusion time. These properties are incompatible with a high thermal resistance across the transition region. Copper provides short thermal diffusion time but is a poor thermal resistor. Stainless steel is a good thermal resistor and has a high heat capacity. In the present invention, the thermal plug 112 is constructed, as shown in FIG. 2, of a stack of thin stainless steel laminae 202 and thin copper laminae 204 interleaved with each other.

The stainless steel laminae 202 provide high thermal resistance in the axial direction while the copper laminae 204 provide thermal conduction in the radial direction. The laminae 202 and 204 are in good heat conductive contact with each other, as by being laminated together with silver solder, so that heat can be quickly diffused by the copper laminae (e.g., shaped as circular disks) and transferred to the stainless steel laminae in the contact therewith. For example, if a hot spot develops along the superconducting strands 116, the copper laminae 204 will diffuse the heat in the radial direction and then to the adjacent stainless steel laminae 202 to slow down the temperature rise of the strands, allowing time for protection devices to operate.

Exemplary thicknesses for the laminae are between 1/16th (0.0625) and 1/8th (0.125) of an inch, but the copper laminae are preferably no thicker than the width of the strands 116 so that the copper does not provide excess heat conduction around the strand. The laminae are soldered together and machined to the shape and cross-section desired for the thermal plug 112. For example, the thermal plug 112 may be cylindrical, with a circular cross section, but other cross sections, such as rectangular, square, etc. are permissible.

In constructing the thermal plug 112, the laminae 202 and 204 are preferably held together using silver/solder. The thin solder layer (shown as 206 in FIG. 2) is placed between the laminae and the stack is heated to melt the solder to the adjacent laminae, and thereafter the stack is cooled to solidify the solder and hold the thermal plug together. The thermal plug 112 of FIG. 2 has eight stainless steel laminae 202 and seven copper laminae, forming a stack about one inch high. Other numbers of laminae 202 and 204 may be used, but the overall thickness (length) of the thermal plug 112 should be such that the heat loss through the copper in the plug is relatively low. Also, as stated above, solid copper leads 114 and 118, in the liquid helium bath and the superfluid helium bath regions, respectively, are soldered on axial ends of the thermal plug 112. To increase the structural strength of the stack and the joint to adjacent conductors, stainless steel pins (not shown) may be passed through holes in the stack and engaged with the conductors on either side of the stack. These pins are poor conductors of heat.

The superconducting strands 116 are soldered along the periphery of the thermal plug 112, and along the normal copper leads 114 and 118, to form a continuous superconducting electrical path. There are sixteen superconducting strands shown in FIG. 3, each soldered in a notch 301, as shown in FIG. 3, around the perimeter of the cylindrical thermal plug 112. The superconducting strands 116 may be formed of any superconducting material, such as niobium-titanium, niobium-tin, and other low and high temperature superconductors, along with generally equal amounts of copper. The notches 301 may be generally circular and the superconducting strands 116 may have a circular cross section, but other cross sections may also be used for the notches 301.

The thermal plug 112 was described above with reference to a temperature differential of just over 2K. However, the thermal plug 112 may be used to separate regions having greater temperature differences. For example, the thermal plug 112 may separate a first region maintained at the temperature of liquid helium, and a second region at the temperature of liquid nitrogen. In such an embodiment the superconducting strands 116 should be HTS, so that they will superconduct at the portion of the thermal plug 112 near the 77K (liquid nitrogen) region.

The thermal plug 112 can be used to separate a very low temperature region and a region having even higher temperatures,—such as a 1.8K He II or 4.2K HE I region having a low temperature superconductor and a region with a normal lead at room temperature. Another application of the present invention where the temperature differential is great is in connecting a low temperature superconductor to a high temperature superconductor. Conventional current connection leads for such purposes consist of optimized length over cross-sectional area copper tubes cooled by helium boil off at the cold end. Some of these leads have a small length of Nb, Sn (a superconducting compound that stays superconducting up to 15K) attached to the lower (cold) end, thereby reducing the $I^2R$ heat generation.

Figure 4:
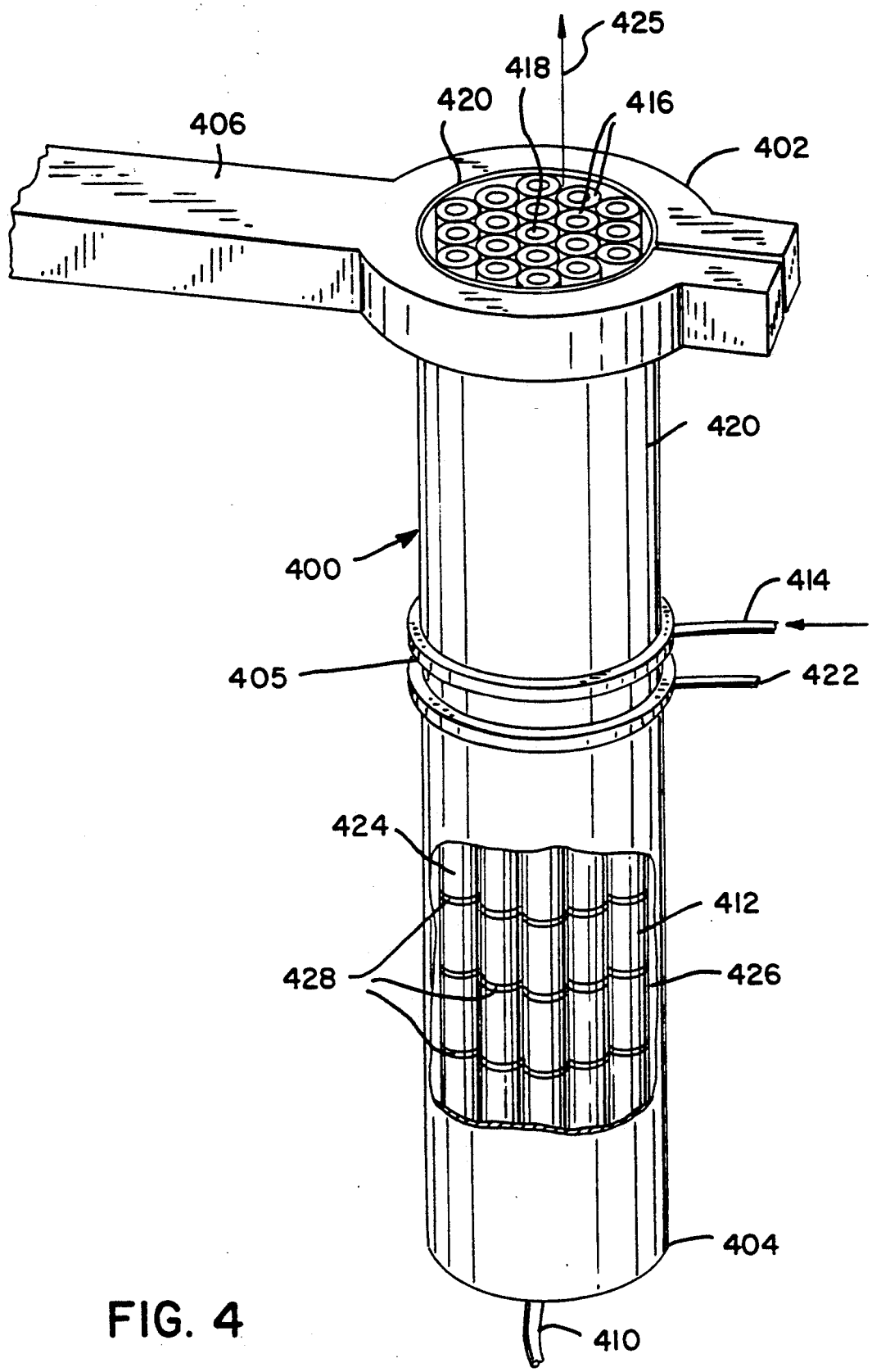
FIG. 4 is a partial cutaway of a perspective view of a device in accordance with the invention having a transition between room temperature and very low temperature.

Referring now to FIG. 4, an electrical lead, designated generally at 400, has a warm end 402, a cold end 404, a room temperature lead 406, a superconducting lead 410, and a transition lead 412. The warm end 402 extends to the room temperature lead 406, and is provided with liquid nitrogen through an inlet 414, located at a middle region 405. The liquid nitrogen maintains a portion of the warm end of the middle region 405 at about 77K. The warm end 402 is insulated from the cold end 404 so that there is no mixing between the liquid helium within the cold end 404 and the liquid nitrogen in the warm end 402.

The warm end 402 is provided with a plurality of copper tube conductors 416 having hollow centers 418. The copper tubes 416 are small, hollow, and clustered inside a larger tube 420, thereby providing as much cooling surface as possible for the nitrogen boil off passing by. The liquid nitrogen inlet 414 at the 77K cooling station provides enough liquid so that the nitrogen gas coming from the top (illustrated by the arrow 425), is after passing by all copper surfaces nitrogen gas coming from the top (illustrated by the inside, room temperature. The nitrogen removes the $I^2R$ heat generated in the conductors 416.

Each copper tube 416 is preferably provided with a plurality of HTS superconducting strands 501, mounted along its perimeter, as shown in FIG. 5, to provide a zero resistance path as long as the temperature is lower than $T_c$ (currently about 100K for certain types of HTS). Thus, the superconducting strands 501 in the lower part of the warm end 402 will generate almost no resistive heat, reducing the amount of nitrogen needed to cool the warm end 402 from what would be required without the strands.

The cold end 404 is cooled by liquid helium boil off, which exits from the cold end 404 through an outlet 422. The liquid helium boil-off partially results from the cold end to 77K heat leak, which is relatively small.

The transition lead 412, extending from the cold end 404, is comprised of a plurality of small copper tubes 424 clustered inside a larger tube 428, also to provide as much surface as possible, so that the liquid helium boil off passing by cools the transition lead 412 as much as possible. Referring now to FIG. 6, each copper tube 424 has a hollow bore 601 and a plurality of HTS wires 602 attached to a plurality of notches 603 in the outer diameter of the copper tubes 424. Since the temperature in the cold end 404 is always lower than 77K, the cold end will always be superconducting and there will be essentially no $I^2R$ heat generation.

A number of thermal plugs 428 are preferably incorporated along the length of the copper tubes 424. The thermal plugs 428 preferably are identical to the thermal plug 112, but in some cases may be comprised only of thin stainless steel "washers". In the event that only stainless steel is used, the construction can be the same as that of thermal plug 112, with the copper laminae 204 replaced with stainless steel laminae 202, or a solid stainless steel plug may be used. Since the thermal conductivity of stainless steel is more than 2 orders of magnitude lower than that of copper, (stainless steel is a highly heat transfer resistive material at cryogenic temperatures) the thermal plugs 428 will greatly reduce the heat conduction from the cold end 404 to the warm end 402, resulting in an order of magnitude improvement in the refrigeration energy loss.

To achieve a stable superconductor design, the thickness of each thermal plug 428 is preferably made small enough so that the superconducting strand 602 attached to it will regain its superconducting state through end cooling of the portions of the strands on either side of the thermal plug following a normalization. Thus, the thickness of the thermal plug 428 must be chosen to be long enough to adequately minimize axial heat conduction across the plug, but be short enough to allow axial heat conduction along each superconducting strand 602 sufficient to lower the temperature of the strand to regain the superconducting state.

Figure 7:
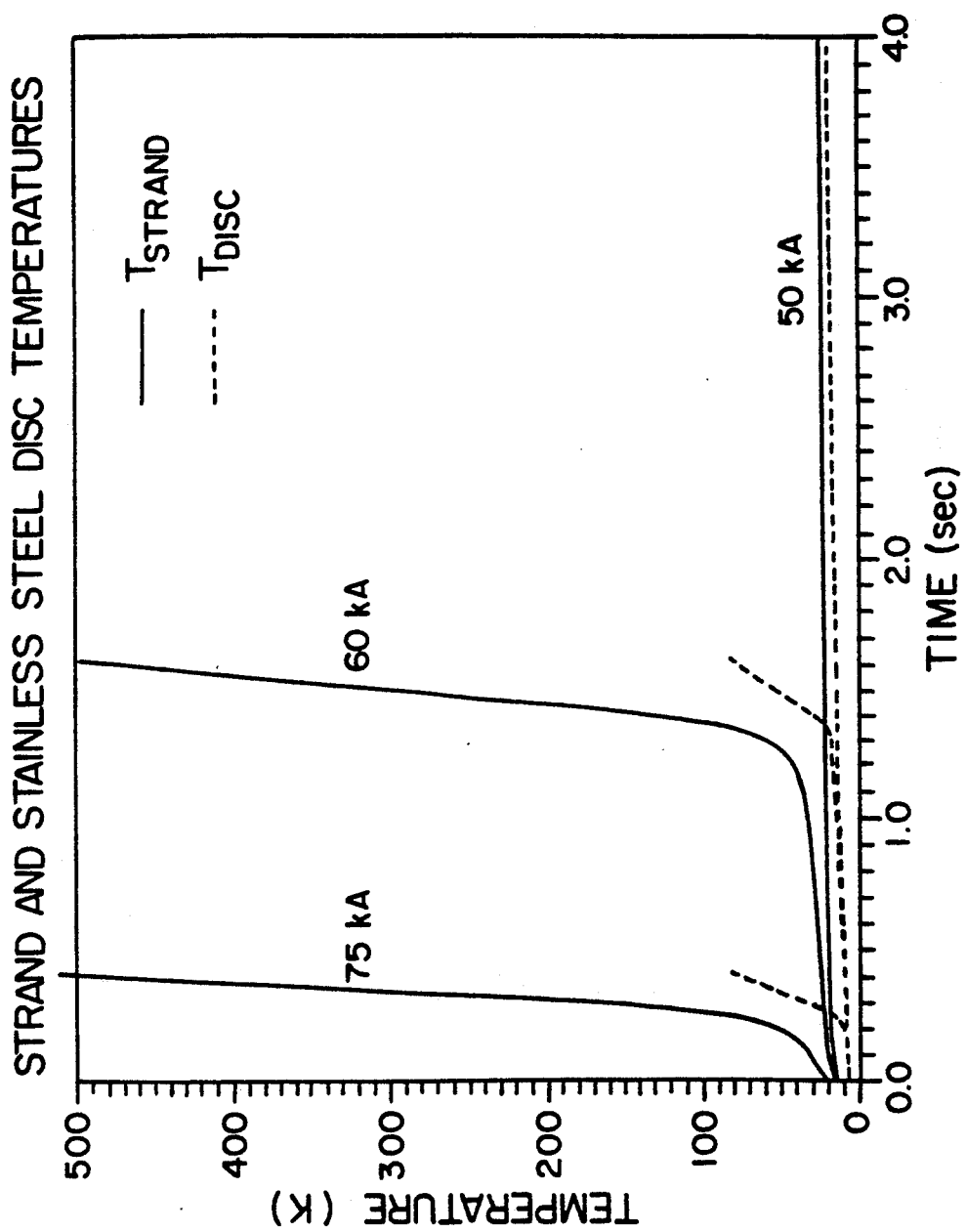
FIG. 7 are graphs of strand and disk temperatures as a function of time for various current levels where an exemplary thermal plug formed only of stainless steel is utilized.
Figure 8:
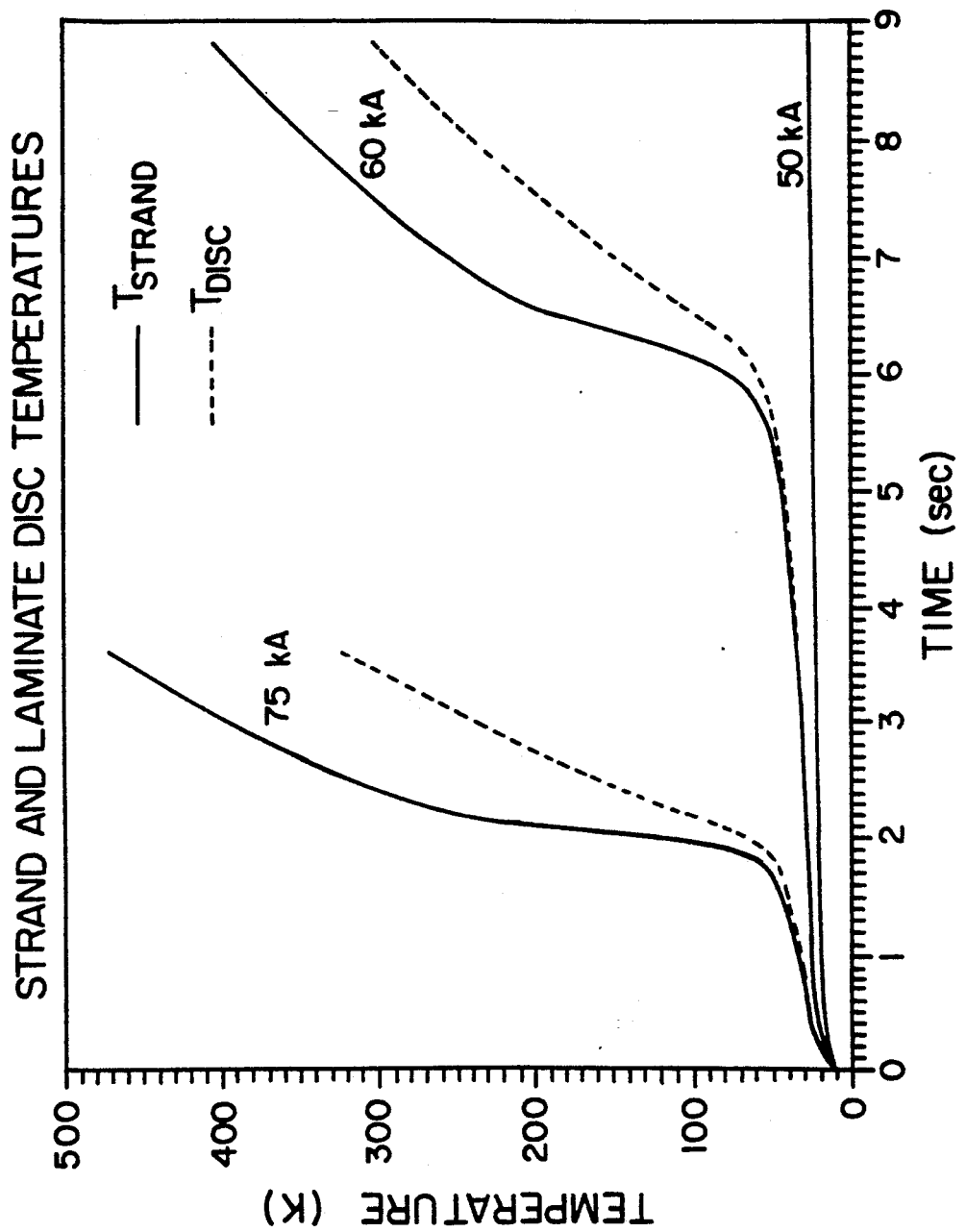
FIG. 8 are graphs of strand and disk temperatures as a function of time for various current levels where a laminated thermal plug is utilized.

FIG. 7 illustrates the rapid run up in temperature which can occur where a thermal plug is used which is formed only of stainless steel. Although such a plug is a good insulator to inhibit heat flow across the transition region at higher current levels (e.g., 60 kA and 75 kA) a hot spot in one of the superconductors causes runaway of the conductor very rapidly, possibly so fast that the current flow cannot be shut off in time to prevent damage to the conductor. As shown in FIG. 8, with the use of the laminated thermal plug 112, the run-up in temperature at the higher current levels occurs more slowly, allowing adequate time to cut off the current flow.

It is understood that the invention is not confined to the particular embodiments set forth herein as illustrative, but embraces such modified forms thereof as come within the scope of the following claims.

What is claimed is:

1. A thermal plug for providing an electrical connection between a first region and a second region which are at different temperatures, comprising:
   (a) a plurality of first laminae formed of a material which is resistive to heat transfer;
   (b) a plurality of second laminae formed of a material which is a good heat conductor interleaved together with the first laminae in a stack to form a laminate, wherein a first end of the stack may be adjacent to the first region, and a second end of the stack may be adjacent to the second region, and wherein the first and second laminae are in heat transfer contact with each other whereby heat from the second laminae is conducted to the first laminae; and
   (c) a plurality of strands of superconductor attached to the stack of laminae, wherein the strands are in heat transfer contact with the laminae.

2. The thermal plug of claim 1 wherein the first laminae are formed of stainless steel.

3. The thermal plug of claim 1 wherein the second laminae are formed of copper.

4. The thermal plug of claim 1 wherein the first laminae are formed of stainless steel and the second laminae are formed of copper.

5. The thermal plug of claim 1 wherein the strands are comprised of high temperature superconducting material.

6. The thermal plug of claim 1 wherein the strands are comprised of low temperature superconducting material.

7. The thermal plug of claim 1 wherein the stack has notches extending along the surface of the stack and wherein the strands are disposed in the notches.

8. The thermal plug of claim 1 wherein each of the first and second laminae is between 0.125 and 0.0625 inch thick.

9. The thermal plug of claim 1 wherein the first and second laminae are all substantially 0.125 inch thick.

10. The thermal plug of claim 1 wherein the first and second laminae have a circular cross section.

11. The thermal plug of claim 1 wherein the stack is constructed with solder between the first and second laminae to hold them together and in good thermal contact with each other.

12. The thermal plug of claim 11 wherein the solder is a silver solder.

13. A superconducting connecting structure comprising:
   (a) a first region, disposed in a first dewar, maintained at a first temperature;
   (b) a second region, disposed in a second dewar, maintained at a second temperature;
   (c) a heat insulating flange disposed between the first and second regions, the flange having an opening connecting the first and second regions;
   (d) a thermal plug in the opening in the flange comprising a plurality of first laminae resistive to heat transfer and a plurality of heat conductive second laminae interleaved with the first laminae to form a laminated stack, wherein the first and second laminae are in heat transfer contact with each other whereby heat from the second laminae is conducted to the first laminae, and a plurality of strands of superconductor attached to the stack of laminae, wherein the strands are in heat transfer contact with the laminae;

(e) the strands of superconductor being in electrical contact with a conductor in the first region and in electrical contact with a conductor in the second region.

14. The structure of claim 13 wherein the first laminae are formed of stainless steel.

15. The structure of claim 13 wherein the second laminae are formed of copper.

16. The structure of claim 13 wherein the first laminae are formed of stainless steel and the second laminae are formed of copper.

17. The structure of claim 13 wherein the strands are comprised of high temperature superconducting material.

18. The structure of claim 13 wherein the strands are comprised of low temperature superconducting material.

19. The structure of claim 13 wherein the stack has notches extending along the surface of the stack and wherein the strands are disposed in the notches.

20. The structure of claim 13 wherein each of the first and second laminae is between 0.125 and 0.0625 inch thick.

21. The structure of claim 13 wherein the first and second laminae are all substantially 0.125 inch thick.

22. The structure of claim 13 wherein the first and second laminae have a circular cross section.

23. The structure of claim 13 wherein the stack is constructed with solder between the first and second laminae to hold them together and in good thermal contact with each other.

24. The structure of claim 23 wherein the solder is a silver solder.

25. A transition lead for electrically connecting a first conductor at a first temperature and a second conductor at a second temperature, comprising:

at least one copper tube having a first end which may be connected to the first conductor and a second end which may be connected to the second conductor;

a plurality of strands of superconductor attached to each tube, the superconducting strands being connectable at a first end to the first conductor and at a second end to the second conductor;

each copper tube having a plurality of thermal plugs disposed therein at spaced positions such that each copper tube is not continuous from the first conductor to the second conductor, wherein each thermal plug is heat transfer resistive, and wherein the superconducting strands are attached to the thermal plugs to be in heat transfer contact therewith.

26. The transition lead of claim 25 wherein the thermal plug includes stainless steel.

27. The transition lead of claim 25 wherein the thermal plug comprises a stack of copper laminae interleaved with stainless steel laminae in heat transfer contact with each other.

28. The transition lead of claim 25 wherein the superconducting strands are comprised of high temperature superconducting material.

29. The transition lead of claim 25 wherein the copper tube and the thermal plugs have notches along the surfaces thereof, and wherein the superconducting strands are disposed in the notches.

30. The transition lead of claim 27 wherein the laminae are each between 0.125 and 0.0625 inches thick.

31. The transition lead of claim 27 wherein the laminae are each substantially 0.125 inches thick.

32. The transition lead of claim 25 wherein the laminae have a circular cross section.

33. The transition lead of claim 25 wherein the copper tube has a hollow bore.

34. The transition lead of claim 27 wherein the stack is constructed by soldering the laminae together to hold them together and in good thermal contact with each other.

35. The transition lead of claim 34 wherein the solder is a silver solder.

* * * * *